United States Patent
Moreno

(10) Patent No.: US 7,108,008 B2
(45) Date of Patent: Sep. 19, 2006

(54) REVERSING VALVE ASSEMBLY WITH IMPROVED PILOT VALVE MOUNTING STRUCTURE

(75) Inventor: Jack A. Moreno, Delaware, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 149 days.

(21) Appl. No.: 10/924,179

(22) Filed: Aug. 23, 2004

(65) Prior Publication Data

US 2006/0037653 A1 Feb. 23, 2006

(51) Int. Cl.
*F16K 31/02* (2006.01)
(52) U.S. Cl. .............................. 137/454.2; 251/129.15
(58) Field of Classification Search ........... 137/625.43, 137/454.2; 251/129.15
See application file for complete search history.

(56) References Cited

U.S. PATENT DOCUMENTS

| | | | |
|---|---|---|---|
| 3,670,768 A * | 6/1972 | Griswold | .................... 137/606 |
| 4,172,582 A | 10/1979 | Bobnar | |
| 4,543,983 A * | 10/1985 | Pauliukonis | ................. 137/356 |
| 4,712,582 A | 12/1987 | Marks | |
| 6,626,645 B1 * | 9/2003 | Okii et al. | ................ 417/222.2 |

* cited by examiner

Primary Examiner—John Fox
(74) Attorney, Agent, or Firm—Reinhart Boerner Van Deuren P.C.

(57) ABSTRACT

Provided is a mounting structure for mounting a pilot valve assembly to a flow reversing valve assembly. The mounting structure includes a mounting bracket and a cover plate. Disposed through a face panel of the mounting bracket is an aperture that defines an axis line. The cover plate is generally parallel to and offset from the face panel. A solenoid coil having a central bore is placed between the face panel and the cover plate such that the central bore aligns with the axis line. A pilot valve body included with the pilot valve assembly is partially inserted through the aperture and into the central bore. Extending over the un-inserted portion of the pilot valve body is a sleeve including a spring. The sleeve and spring are arranged such that the spring urges the mounting bracket, the solenoid coil, and the cover plate toward one another.

20 Claims, 4 Drawing Sheets

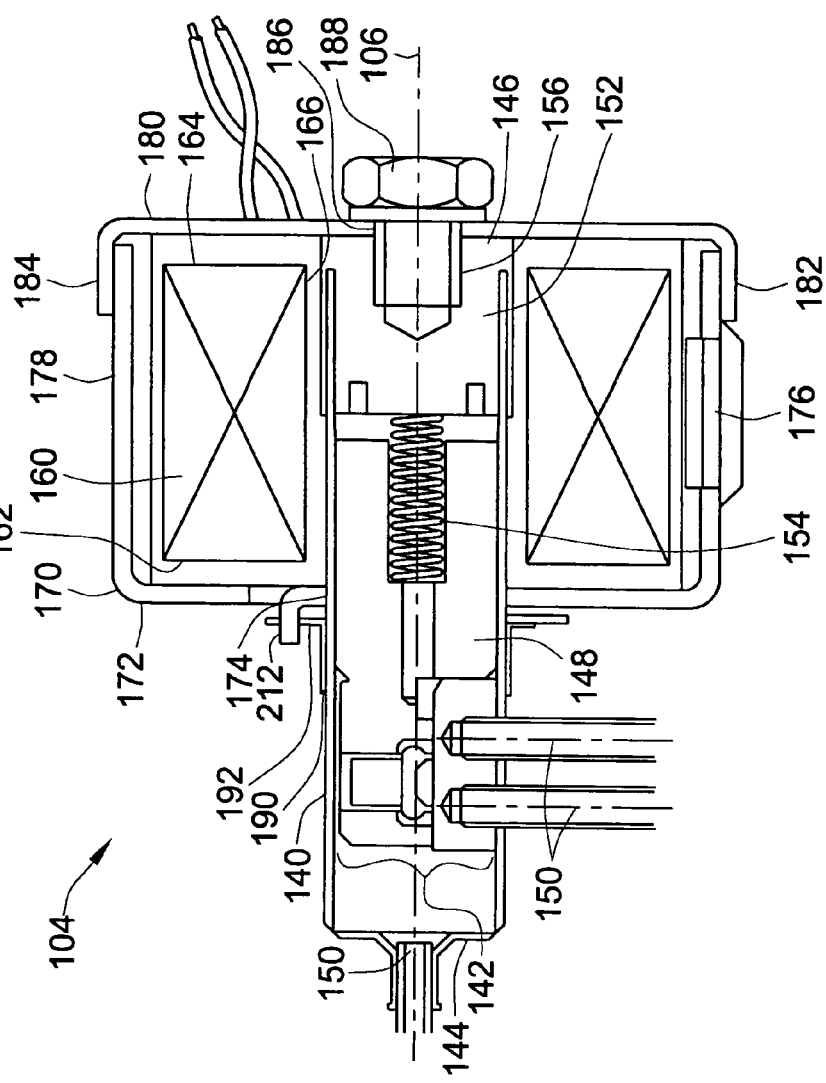
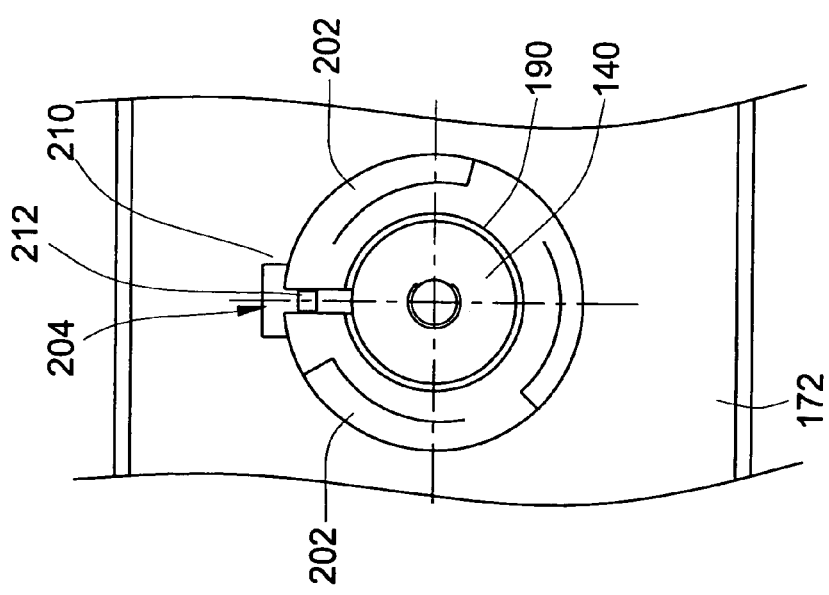

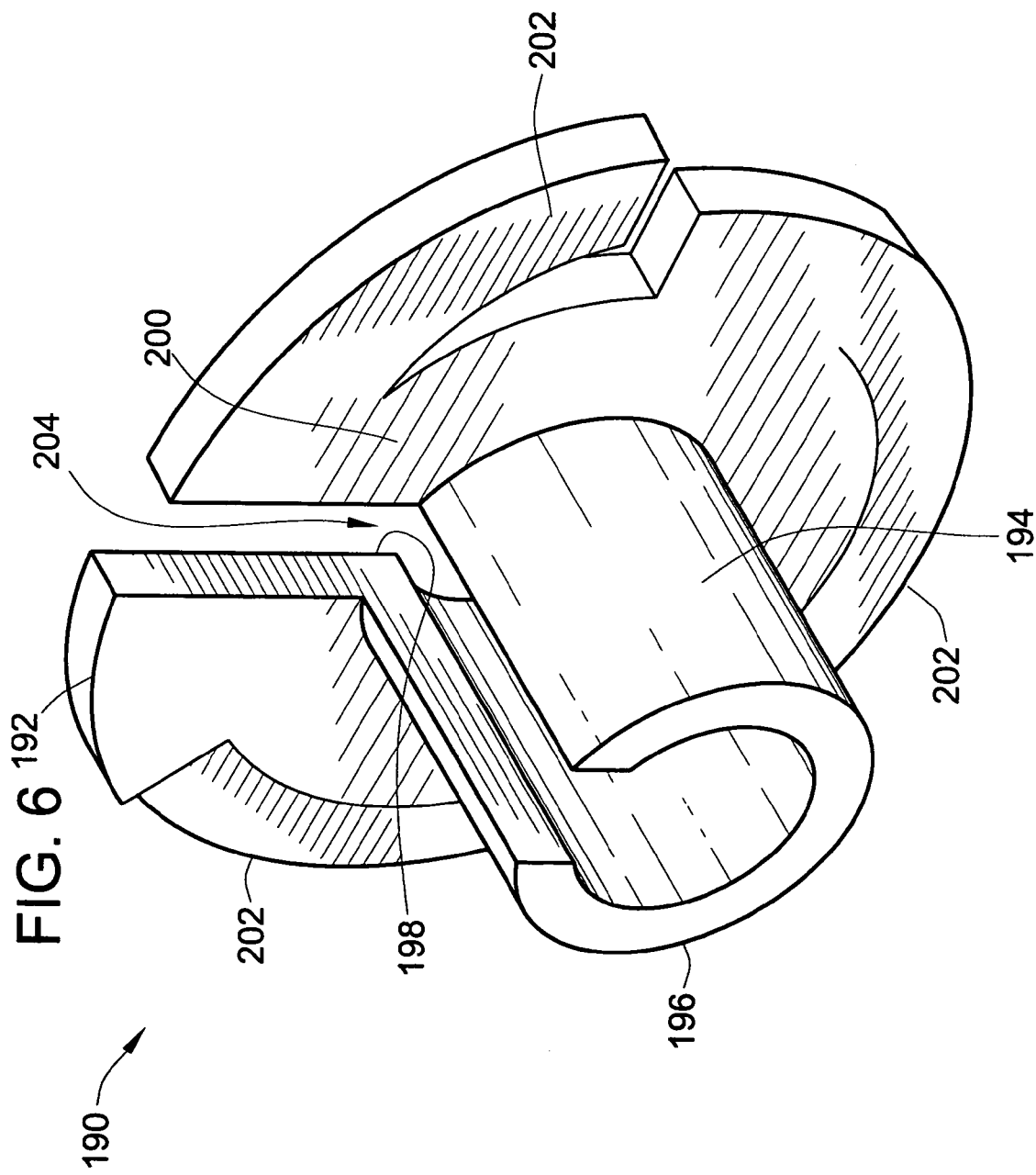

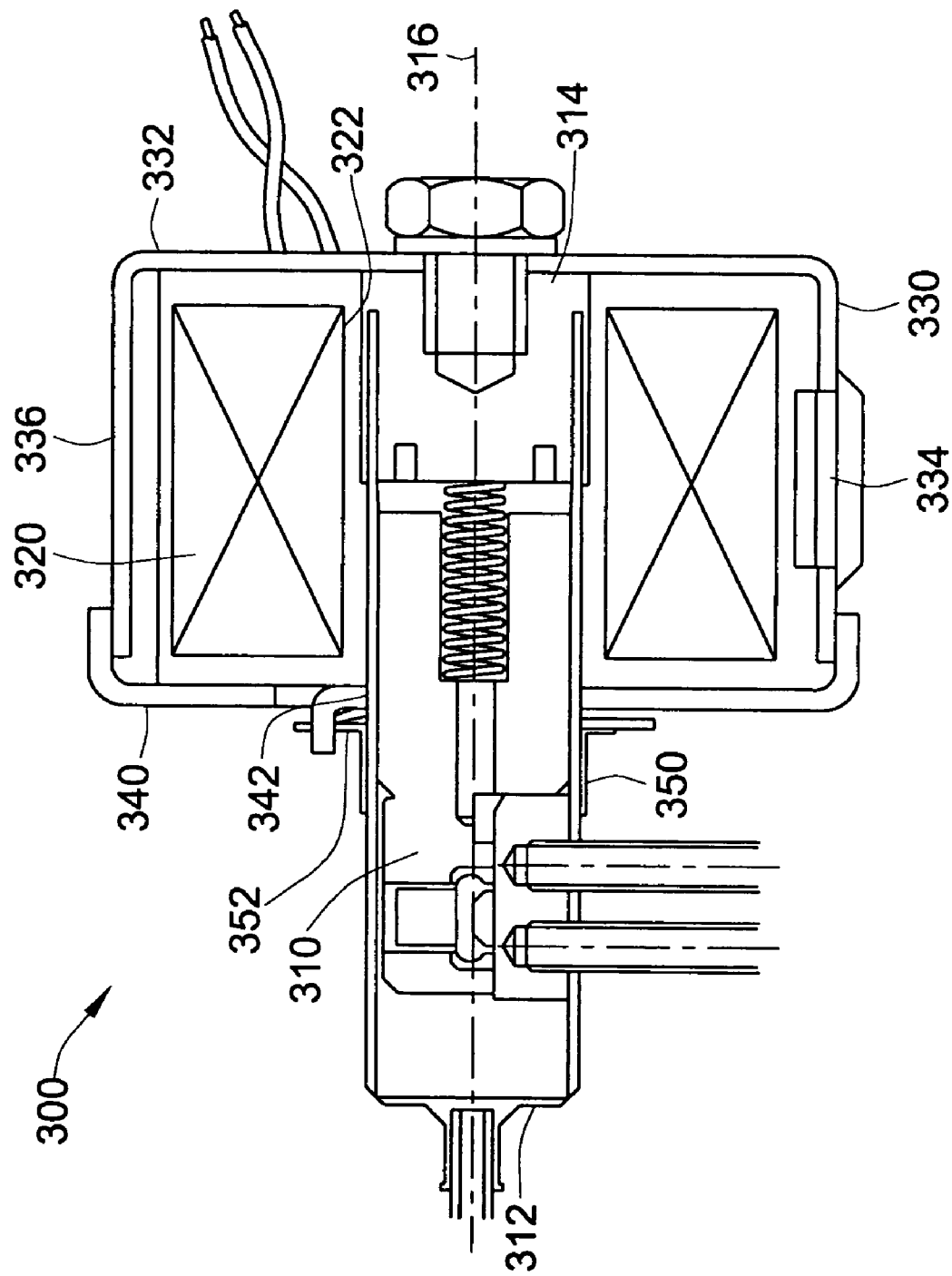

REVERSING VALVE ASSEMBLY WITH IMPROVED PILOT VALVE MOUNTING STRUCTURE

FIELD OF THE INVENTION

This invention pertains generally to reversing valves and more particularly to reversing valves having a solenoid-operated pilot valve for controlling operation of the reversing valve.

BACKGROUND OF THE INVENTION

Reversing valve assemblies are typically used in fluid flow systems in which a fluid is directed to flow in various alternative loops or circuits. For instance, heat pumps are specialized refrigeration systems that can be selectively configured to operate in either of two different modes. In the first mode, known as the cooling mode, energy in the form of heat is removed from an "inside" environment and transferred to an "outside" environment. In the second mode, known as the heating mode, heat energy is transferred to the inside environment. To convey the heat energy, the heat pump system utilizes a compressor to circulate fluid refrigerant through a closed-circuit system that includes heat transfer coils located in each environment. In addition to circulating the refrigerant, the compressor is used to impart thermodynamic energy into the system.

To change the heat pump system between heating and cooling modes, the system includes the reversing valve assembly which can be selectively manipulated to alter the flow of refrigerant. The reversing valve assembly typically includes a reversing valve body having multiple ports that are interconnected with the heat transfer coils and the compressor. The reversing valve body also encloses a movable valve member that can be selectively placed between two different positions wherein the valve member directs refrigerant flow between different groupings of the ports. The valve member is moved in response to a change in actuating pressure that is supplied to the reversing valve body. Fluid refrigerant drawn off from the system is typically used as the source for the actuating pressure.

To control the change in the actuating pressure and thereby control the motion of the valve member, the reversing valve assembly typically includes a pilot valve assembly that is attached to the reversing valve body. The pilot valve assembly is an electrically-operated device that is in fluid communication with both the reversing valve body and the heat pump system to draw off refrigerant. To change the actuating pressure supplied to the reversing valve body, the pilot valve assembly includes an elongated pilot valve body having a plunger reciprocally movable therein. Different positions of the plunger cause the pilot valve assembly to alter the supply of the actuating pressure to the reversing valve body. The position of the plunger can be altered by activating a solenoid coil that surrounds a portion of the pilot valve body.

To attach the pilot valve assembly to the reversing valve body, often a mounting bracket is rigidly joined to the reversing valve body. The pilot valve body can be received in and extend from the mounting bracket. To secure the pilot valve body to the mounting bracket, the pilot valve body is often crimped in place or retained to the mounting bracket with a retainer clip. Typically, the solenoid coil is provided with a distinct solenoid coil frame that must be separately installed to the mounting frame with another fastener. This prior art attachment method requires the use of separate mounting brackets and coil frames. Additionally, the solenoid coil frame is often installed over the extended portion of the pilot valve body in a cantilevered fashion. Cantilevered mounting of the solenoid coil subjects the pilot valve assembly to possible damage due to impact during handling and installation of the reversing valve assembly.

U.S. Pat. No. 4,712,582, assigned to Ranco Incorporated, herein incorporated in its entirety by reference, addresses the drawbacks of separately mounting the pilot valve body and the solenoid coil frame. U.S. Pat. No. 4,712,582 describes mounting an anchoring panel to the reversing valve body, then fixing a cylindrical hub to the anchoring panel. The pilot valve body is then inserted into the cylindrical hub such that a portion of the valve body projects away from the anchoring panel. A solenoid coil is next inserted over a projecting portion of the pilot valve body and placed adjacent to the anchoring panel. A retainer panel is detachably connected to the projecting portion of the pilot valve body to enclose the solenoid coil between the anchoring panel and retainer panel.

Typically, to detachably connect the retainer panel, a threaded nut is fastened over the projecting portion of the pilot valve body thereby clamping the solenoid coil between the anchoring panel and retainer panel. Care must be taken during assembly to avoid over-tightening the nut and damaging the solenoid coil. Also, in actual production of the reversing valve assembly described in U.S. Pat. No. 4,712,582, the pilot valve body and the cylindrical hub attached to the anchoring panel are often press fit together, therefore requiring precisely machined parts. All this adds to the complexity and expense of the reversing valve assembly.

BRIEF SUMMARY OF THE INVENTION

The present invention provides a reversing valve assembly having an improved mounting structure for attaching a pilot valve assembly. The reversing valve assembly includes a mounting bracket having an anchor panel attached to the reversing valve body, an intermediate face panel attached perpendicularly to the anchor panel, and a third panel generally parallel to the anchor panel and extending from the opposite edge of the face panel. An aperture is disposed through the face panel and thereby defines an axis line. Also included is a detachable cover plate that can be arranged parallel to the face panel and offset from the face panel by the anchor panel and the third panel.

To activate the pilot valve assembly, an electrically actuated solenoid coil is inserted between the mounting bracket and enclosed therein by the cover plate. The solenoid coil includes a central bore and is arranged such that the central bore is aligned with the axis line. The pilot valve assembly also includes an elongated pilot valve body that has a valve end and a securing end. A portion of the pilot valve body is inserted through the aperture and into the central bore such that the securing end abuts against the cover plate and is secured thereto. Any suitable securing method, such as use of threaded fasteners, retaining rings, and welding, can be used to secure the pilot valve body and the cover plate. As such, both the pilot valve assembly and the solenoid coil are mounted to the reversing valve by the same mounting bracket and cover plate combination.

To prevent the solenoid coil from rattling within the mounting bracket and to ensure a good magnetic coupling with the mounting structure, the solenoid coil is urged against the cover plate. Specifically, the pilot valve assembly includes a sleeve surrounding the portion of the pilot valve body that is not inserted into the central bore. To facilitate extending the sleeve over the pilot valve body, there is disposed through the sidewall of the sleeve a slit that allows for adjusting the size of the sleeve diameter. The sleeve also includes a spring that urges the face panel of the mounting bracket, and the cover plate toward one another.

An advantage of the present invention is that it provides a mounting structure for a pilot valve assembly that does not support the solenoid coil in a cantilevered fashion. Another advantage is that the present invention provides a mounting structure that does not require a separate solenoid coil frame. Another advantage is that the present invention positively urges the solenoid coil against the cover plate thereby preventing the solenoid coil from rattling within the mounting bracket and ensuring good magnetic coupling. These and other advantages and features of the present invention will be apparent from the detailed description and the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 4 is a cross-sectional view of the pilot valve assembly including a solenoid coil, a mounting bracket, and a cover plate taken along line 4—4 of FIGS. 2 and 3.

FIG. 5 is a partial front elevational view of the pilot valve assembly and mounting bracket.

FIG. 6 is a perspective view of a sleeve that is inserted over and included as part of the pilot valve assembly.

FIG. 7 is a cross-sectional view of another embodiment of the pilot valve assembly similar to the view taken along line 4—4.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
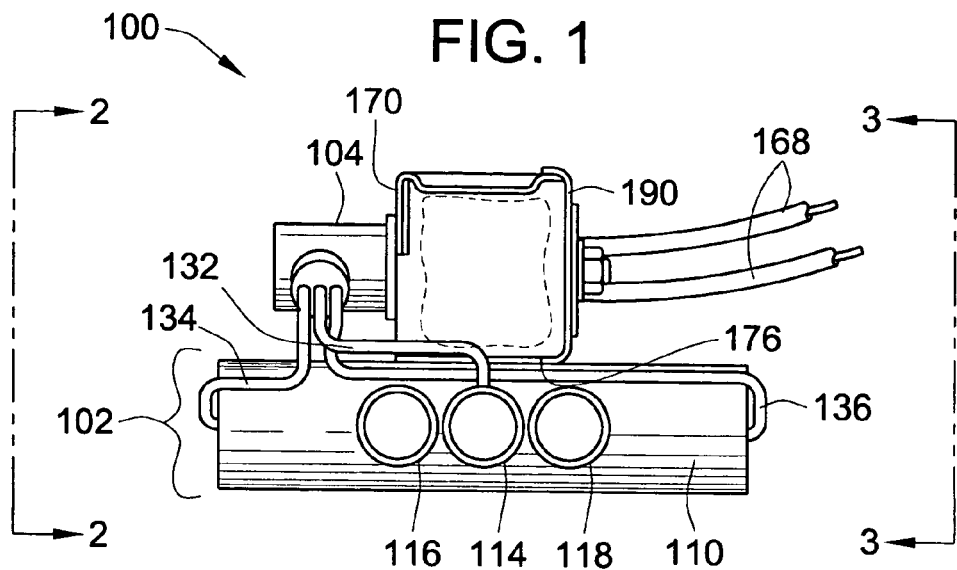
FIG. 1 is a front elevational view of a reversing valve assembly including a reversing valve and a pilot valve assembly mounted thereto.
Figure 2:
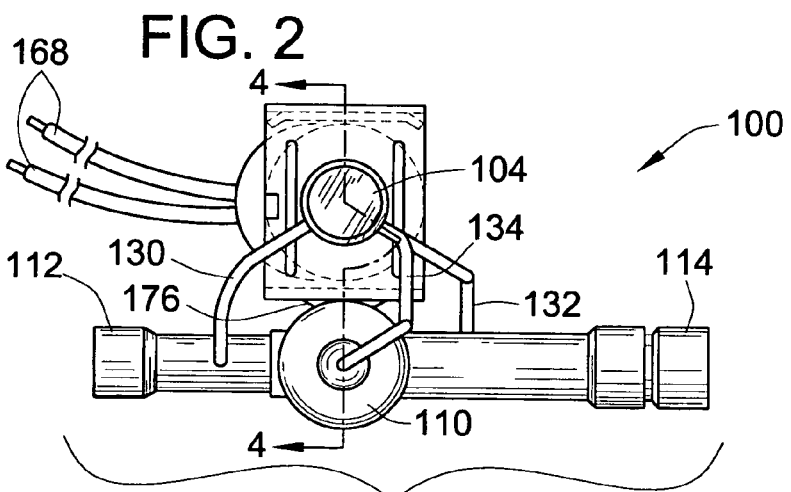
FIG. 2 is a side elevational view of the reversing valve assembly of FIG. 1 taken along line 2—2.
Figure 3:
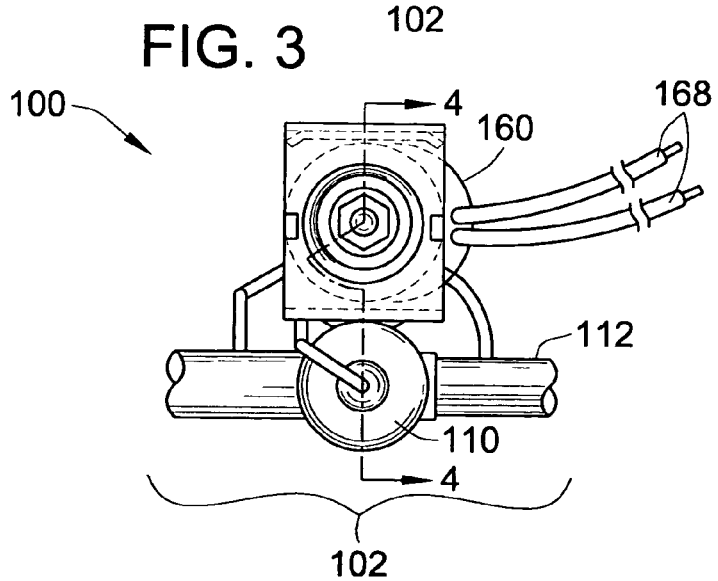
FIG. 3 is a side elevational view of the reversing valve assembly of FIG. 1 taken along line 3—3.

Now referring to the drawings, wherein like reference numbers refer to like elements, there is illustrated in FIGS. 1–3 an example of a reversing valve assembly 100 for use in a refrigeration system such as a heat pump. Heat pump systems typically include an "inside" heat exchanger located in an "inside" environment, an "outside" heat exchanger located in an outside environment, and a compressor for pressuring and pumping fluid refrigerant through the system. Heat pump systems are operable in two modes: a heating mode in which heat energy is transferred to the inside environment by the inside heat exchanger and a cooling mode in which heat energy is removed from the inside environment. To switch between the heating and cooling modes, the reversing valve assembly 100 is interconnected within the heat pump system and can selectively redirect the fluid refrigerant flow through the system.

The reversing valve assembly 100 includes a reversing valve 102 for selectively directing refrigerant through the heat pump system. The reversing valve 102 includes a tubular, elongated reversing valve body 110 from which extends at least four flow tubes 112, 114, 116, 118. The flow tubes can interconnect with refrigerant flow lines to establish fluid communication between the reversing valve 102 and the other components of the heat pump system. Typically, the first flow tube 112 communicates with the high pressure discharge of the compressor while the second flow tube 114 communicates with the low pressure inlet of the compressor. The third and fourth flow tubes communicate with the heat exchangers. To direct refrigerant flow between various flow tubes, there is enclosed in the reversing valve body 110 a reciprocally moving valve member. The position of the movable valve member within the reversing valve body 110 governs the direction of refrigerant flow through the heat pump system and thus determines whether the system is operating in the heating or cooling modes.

To control the position of the valve member, the reversing valve assembly also includes a pilot valve assembly 104 mounted to the reversing valve 102. The pilot valve assembly 104 utilizes the pressurized refrigerant flowing in the heat pump system and converts that refrigerant pressure to an actuating pressure that physically moves the valve member. To accomplish this, in the illustrated embodiment, the pilot valve assembly 104 communicates by pipette 130 to the first flow tube 112 to draw off high pressure refrigerant from the compressor discharge while also communicating by pipette 132 to the second flow tube 114 to draw off low pressure from the compressor inlet. These pressures are communicated by the pilot valve assembly 104 via pipettes 134, 136 to the opposite ends of the reversing valve body 110 to create a pressure differential within the reversing valve body. Selective actuation of the pilot valve assembly 104 reverses the pressures being supplied to the opposing ends, thereby reversing the pressure differential and causing repositioning of the valve member within the reversing valve body 110.

Referring to FIG. 4, the pilot valve assembly 104 includes an elongated pilot valve body 140 that encloses the pilot valve components 142 used to selectively direct the drawn system pressures to the reversing valve body. In the illustrated embodiment, the pilot valve body 104 is a cylindrical, tubular structure that extends along an axis line 106 between a first end, called the valve end 144, and an opposing second end, called the securing end 146. The pilot valve components 142 are movably situated toward the valve end 144 where they can be moved by the action of a plunger 148 slidably received within the pilot valve body 140 and aligned with the axis line 106. Disposed at various orientations into the pilot valve body 140 proximate the valve end 144 is a plurality of ports 150 that connect with the pipettes communicating with the reversing valve. Situated at and enclosing the securing end 146 of the pilot valve body 140 is an end cap 152. To bias the plunger 148 in a first position, there is also enclosed within the pilot valve body a helical spring 154 that extends between the end cap 152 and the plunger.

To activate the pilot valve assembly, there is also included an electrically activated solenoid coil 160. The solenoid coil is formed from conductive wire that is wound to produce an electromagnetic effect when energized. The wound wire is preferably encapsulated in plastic or similar material and is shaped as a cylindrical drum having a first coil face 162, an opposing second coil face 164, and a central bore 166 disposed therebetween. When the pilot valve assembly 104 is assembled to the solenoid coil 160, the pilot valve body 140 is received into the central bore 166 such that the valve end 144 projects beyond the first coil face 162 and the solenoid coil surrounds the securing end 146. The pilot valve body 140 and the central bore 166 are preferably sized to engage together in a sliding fit. Accordingly, when assembled, the central bore 166 is coaxial to the pilot valve body 140 along the axis line 106. As will be appreciated by those of skill in the art, when the solenoid coil 160 is energized, the plunger 148 is axially drawn toward the securing end 146 thereby compressing the helical spring 154 against the end cap 152. To connect the solenoid coil 160 to a power source, two lead wires 168 are included.

To mount the pilot valve assembly 104 to the reversing valve, a mounting bracket 170 and a cover plate 180 are provided. Preferably, the mounting bracket is a three-sided structure made from sheet metal or other magnetically permeable materials. The intermediate side is defined by a face panel 172 that is arranged orthogonally to the axis line 106. Disposed through the face panel 172 is an aperture 174. Extending perpendicularly from one edge of the face panel 172 is an anchor panel 176 while extending from an opposite edge of the face panel parallel to the anchor panel is a third panel 178. Each of the panels can have a generally rectangular shape and are generally planar. The panels can be continuously formed from a common blank of material through a stamping and bending operation.

Referring again to FIGS. 1–3, to attach the mounting bracket 170 to the reversing valve 102, the anchor plate 176 is joined to approximately the midpoint of the reversing valve body 110. Various joining methods can be used to accomplish this, including welding, soldering, and adhesive bonding.

Returning to FIG. 4, the cover plate 180 is a separate, removable structure that is preferably made from the same magnetically permeable material as the mounting bracket 170. The cover plate 180 has a generally rectangular shape with at least two opposing edges bent perpendicularly to produce opposing first and second flanges 182, 184. The cover plate 180 also has disposed through it a second aperture 186. When assembled, the cover plate 180 is arranged parallel to the face panel 172 and offset from the face panel by the anchor panel 176 and the third panel 178. Additionally, to attach the cover plate 180 to the mounting bracket 170 and to locate the second aperture 186 with respect to the axis line 106, the first and second flanges 182, 184 overlap opposite surfaces of the anchor panel 176 and the third panel 178 respectively, thus retaining the mounting bracket between the flanges. Like the mounting bracket 170, the cover plate 180 can also be formed from a continuous blank of material through a stamping and bending process.

When the pilot valve assembly, solenoid coil, and mounting bracket are assembled together, the solenoid coil 160 is located in the mounting bracket 170 with the first cylindrical face 162 proximate to the face panel 172 and the central bore 166 aligned with the axis line 106. The cover plate 180 is attached to the mounting bracket 170 so that the solenoid coil 160 is located between the face panel 172 and cover plate. When the pilot valve body 140 is received into the central bore 166, as described above, the valve end 144 projects through the first aperture 174 and the securing end 146 abuts against the cover plate 180. As will be appreciated, the distance between the first aperture 174 and the anchor panel 176 determines the offset between the axis line 106 and the reversing valve.

In the illustrated embodiment, to hold the pilot valve assembly 104, solenoid coil 160, and mounting bracket 170 together, there is disposed into the end cap 152 a threaded hole 156 that can receive a threaded fastener 188 inserted through the second aperture 186 in the cover plate 180. Hence the securing end 146 is secured to the cover plate 180. Furthermore, both the pilot valve body 140 and solenoid coil 160 are mounted to the reversing valve by the same mounting bracket 170 and cover plate 180 combination. As will be appreciated by those of skill in the art, in other embodiments, different structures and methods can be used to secure the securing end and cover plate, such as retaining rings, staking, welding, etc.

To prevent the solenoid coil 160 from rattling between the face panel 172 and cover plate 180 during operation, the pilot valve assembly 104 includes a sleeve 190 having a spring 192 for urging the face panel 172 of the mounting bracket 170 and the solenoid coil 160 toward the cover plate 180. Referring to FIG. 6, in an embodiment, the sleeve 190 includes a generally cylindrical sidewall 194 that extends between a first end 196 and a second end 198. In an embodiment, the spring 192 is formed at the second end 198 as an outward-extending, annular flange 200 oriented orthogonally to the cylindrical sidewall 194. A plurality of spring fingers 202 are formed into the annular flange and are arranged to curve radially about, and are thereby concentric with, the cylindrical sidewall 194. Furthermore, the spring fingers 202 project from a plane defined by the annular flange 200 in the direction away from the first end 196. In another embodiment, the radially curving spring fingers can be replaced with straight fingers that extend radially outward. Other embodiments can utilize different spring designs. In addition to the spring, the sleeve 190 also includes a slit 204 disposed from the first end 196 to the second end 198 through both the sidewall 194 and across the annular flange 200. The slit 204 thereby splits the sleeve 190.

Referring to FIGS. 4 and 5, the sleeve 190 is extended over the portion of the pilot valve body 140 projecting through the first aperture 174 so that the spring 192 is approximately adjacent the face panel 172 and the cylindrical sidewall 194 extends toward the valve end 144 of the pilot valve body. The spring fingers 202 contact and apply axially directed force to the face panel 172 of the mounting bracket 170, to thereby urge the face panel and the solenoid coil 160 to move axially along the axis line 106 toward the cover plate 180. Preferably, the spring fingers 202 urge the solenoid coil 160 such that the second coil face 164 is adjacent the cover plate 180. In addition to preventing rattling of the solenoid coil 160 within the mounting bracket 170, urging the solenoid coil against the cover plate 180 helps guarantee a good magnetic coupling between the solenoid coil, cover plate, and mounting bracket.

Referring to FIGS. 4, 5, and 6, to securely attach the sleeve 190 to the pilot valve assembly 104, the diameter of the cylindrical sidewall 194 is preferably smaller than the diameter of the cylindrical pilot valve body 140. When the sleeve 190 is extended over the pilot valve body 140, the slit 204 allows the diameter of cylindrical sidewall 194 to expand thereby accommodating the larger pilot valve body. The difference in sizes between the cylindrical sidewall 194 and pilot valve body 140 results in a compressive fit that prevents the sleeve 190 from sliding axially with respect to the pilot valve body when the spring fingers 202 urge against the solenoid coil 160. Preferably, the sleeve is extended over the pilot valve body before the pilot valve body is received through the first aperture and into the central bore.

To facilitate securing the securing end 146 of the pilot valve body 140 to the cover plate 180, the mounting bracket 170 can be configured to fixedly engage the sleeve 190. Specifically, the face panel 172 can include a tab 212 extending outward from the face panel 172 toward the valve end 144 of the pilot valve body 104 and into the slit 204 in the sleeve 190. In the illustrated embodiment, the tab 212 is an L-shaped prong that projects away from the face panel 172. When the pilot valve body 140 is received through the aperture 174 and into the central bore 166, the tab 212 can be aligned with and received into the slit 204 disposed through the sleeve 190. As will be appreciated, the engagement between the tab 212 and slit 204 prevents the pilot valve body 140 from rotating about the axis 106 when the threaded fastener 188 is secured to the threaded hole 156 disposed into the end cap 152.

Hence, the present invention provides a novel mounting structure for mounting a pilot valve assembly and a solenoid coil to a flow reversing valve. The mounting structure includes a three-sided mounting bracket and a cover plate, between which the solenoid coil is placed. A face panel of the mounting plate includes an aperture that defines an axis line that is coaxial with the central bore of the solenoid coil. A portion of the pilot valve assembly is inserted through the aperture and received in the solenoid coil's central bore such that a securing end of the pilot valve body abuts against and is secured to the cover plate. A sleeve including a spring is extended over the portion of the pilot valve assembly that projects from the aperture such that the spring can project into the aperture and urge the solenoid coil against the cover plate.

In the context of the present invention, it is contemplated that the arrangement of the mounting bracket and the cover plate can be readily switched. Accordingly, referring to FIG. 7, there is illustrated another embodiment of the pilot valve assembly 300 having an elongated pilot valve body 310 that extends along an axis line 316 between a valve end 312 and a securing end 314. Also included are a solenoid coil 320 having a central bore 322, a three-sided mounting bracket 330, and a cover plate 340.

To mount the pilot valve assembly 300 to the reversing valve, the mounting bracket 330 includes an anchor panel 334 that extends from the face plate 332. The cover plate 340 is arranged parallel to the face panel 332 and offset from the face panel by the anchor panel 334 and a third panel 336. When assembled, the solenoid coil 320 is place between the face panel 332 and the cover plate 340. The pilot valve body 310 then projects through an aperture 342 disposed through the cover plate 340 and across the central bore 322 of the solenoid coil 320 such that the securing end 314 abuts against and is secured to the face plate 332. Accordingly, the aperture 342 and central bore 322 are aligned with the axis line 316. To prevent the solenoid coil 320 from rattling, a sleeve 350 having a spring 352 is extend over a portion of the pilot valve body 310 so that the spring 352 applies an axially directed force against the cover plate 340 for urging the cover plate 340 and solenoid coil 320 to move toward the face plate 332 of the mounting bracket 330. Preferably, the spring 352, cover plate 340 and mounting bracket 330 are mutually configured such that the spring 352 clamps the solenoid coil 320 between the cover plate 340 and the face panel 332 of the mounting bracket 330.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve assembly comprising:
a mounting bracket including an anchor panel and a face panel extending generally perpendicularly from the anchor panel, the face panel having an aperture disposed therein, the aperture defining an axis line;
a cover plate arranged generally parallel to and spaced apart from the face panel;
a solenoid coil including a central bore, the solenoid coil received between the face panel and the cover plate such that the central bore is aligned with the axis line;
a pilot valve assembly including an elongated pilot valve body having a valve end and an opposing securing end, the pilot valve body being received in the central bore and extending along the axis line such that the valve end projects from the aperture; and
a tubular sleeve including a spring, the sleeve extending over the pilot valve body such that the spring urges the face panel of the mounting bracket, the solenoid coil, and the cover plate toward one another.

2. The valve assembly of claim 1, wherein the pilot valve body is generally cylindrical and the sleeve includes a generally cylindrical sidewall extending between a first end and a second end, the sidewall extending over the pilot valve body.

3. The valve assembly of claim 2, wherein the spring is arranged at the second end and the spring includes a plurality of spring fingers projecting in a direction away from the first end.

4. The valve assembly of claim 3, wherein the each spring finger is radially offset from and curves partly about the cylindrical sidewall.

5. The valve assembly of claim 3, wherein the sleeve includes a slit disposed through the sidewall from the second end to the first end.

6. The valve assembly of claim 5, wherein the diameter of the sidewall is less than the diameter of pilot valve body, and the sidewall exerts a compressive force on the pilot valve body.

7. The valve assembly of claim 6, wherein the mounting bracket includes a tab projecting into the slit in the sleeve.

8. The valve assembly of claim 1, wherein the securing end abuts against and is secured to the cover plate.

9. The valve assembly of claim 8, further comprising a threaded fastener, wherein the securing end includes a threaded hole, the cover plate includes a second aperture, and the threaded fastener extends through the second aperture and is received in the threaded hole.

10. The valve assembly of claim 1, wherein the mounting bracket includes a third panel extending generally perpendicularly from the face panel and generally parallel to the anchor panel.

11. The valve assembly of claim 10, wherein the cover plate includes a first flange and a second flange, the first and second flanges bent toward the face plate, the first flange overlapping the anchor plate and the second flange overlapping the third plate to attach the cover plate to the mounting bracket.

12. The valve assembly of claim 11, wherein the mounting bracket is formed from a continuous blank of sheet metal.

13. The valve assembly of claim 12, wherein the cover plate is formed from a continuous blank of sheet metal.

14. The valve assembly of claim 1, further comprising a threaded fastener, and wherein the securing end defines a threaded hole, wherein the cover plate defines a second aperture, and wherein the threaded fastener extends through the second aperture and is received in the threaded hole to secure the securing end to the cover plate.

15. A solenoid-operated valve assembly comprising:
a mounting bracket including a face panel, an anchor panel extending generally perpendicular from the face panel, and a third panel extending generally perpendicular from the face panel and generally parallel to the anchor panel, the face panel having an aperture disposed therein, the aperture defining an axis line;
a cover plate attached to the mounting bracket, the cover plate generally parallel to the face panel and offset from the face panel by the anchor panel and the third panel;
a solenoid coil having a central bore, the solenoid coil arranged between the face panel and the cover plate such that the central bore is aligned with the axis line;
an elongated valve body extending between a valve end and a securing end, the valve body generally aligned with the axis line and received in the central bore such that the valve end extends from the aperture; and
a tubular sleeve including a spring, the sleeve extending over the valve body such that the spring urges the face panel of the mounting bracket, the solenoid coil, and the cover plate toward one another.

16. The valve assembly of claim 15, wherein the spring includes a plurality of spring fingers, each spring finger radially offset from and curving partly about the axis line.

17. The valve assembly of claim 16, wherein the mounting bracket includes a tab projecting therefrom, and the sleeve includes a slit disposed therein parallel to the axis line, the sleeve arranged to receive the tab in the slit.

18. The valve assembly of claim 17, wherein the sleeve and the valve body are generally cylindrical, the diameter of the sleeve being less than the diameter of the valve body, and the sleeve exerts a compressive force on the valve body.

19. A method of assembling a valve assembly comprising:
providing a mounting bracket including a face panel extending between and generally perpendicular to an anchor panel and a third panel, the face panel including a aperture disposed therein defining an axis line;
placing a solenoid coil having a central bore between the anchor panel and the third panel such that the central bore is aligned with the axis line;
attaching a cover plate to the mounting bracket such that the solenoid coil is between the face panel and the cover plate;
extending a tubular sleeve over an elongated, cylindrical valve body, the tubular sleeve including a spring;
inserting the valve body through the aperture and into the central bore such that the spring urges the face panel of the mounting bracket, the solenoid coil, and the cover plate toward one another.

20. A solenoid operated valve assembly:
a mounting bracket including a face panel, an anchor panel extending generally perpendicular from the face panel, and a third panel extending generally perpendicular from the face panel and generally parallel to the anchor panel;
a cover plate attached to the mounting bracket, the cover plate generally parallel to the face panel and offset from the face panel by the anchor panel and the third panel, the cover panel having an aperture disposed therein, the aperture defining an axis line;
a solenoid coil having a central bore, the solenoid coil arranged between the face panel and the cover plate such that the central bore is aligned with the axis line;
an elongated valve body extending between a valve end and a securing end, the valve body generally aligned with the axis line and received in the central bore such that the valve end extends from the aperture; and
a tubular sleeve including a spring, the sleeve extending over the valve body such that the spring urges the face panel of the mounting bracket, the solenoid coil, and the cover plate toward one another.

* * * * *